US006233006B1

(12) United States Patent
Lee

(10) Patent No.: US 6,233,006 B1
(45) Date of Patent: May 15, 2001

(54) IMAGE CHANGE DETECTING MACHINE BY USING CHARACTER GENERATOR AND METHOD THEREOF

(75) Inventor: Hyung Joo Lee, Seoul (KR)

(73) Assignee: Samsong Industries, Ltd., Seoul (KR)

( * ) Notice: Subject to any disclaimer, the term of this patent is extended or adjusted under 35 U.S.C. 154(b) by 0 days.

(21) Appl. No.: 09/072,118

(22) Filed: May 4, 1998

(30) Foreign Application Priority Data

May 27, 1997 (KR) .................................................. 97-21041

(51) Int. Cl.[7] ....................................................... H04N 7/18
(52) U.S. Cl. ............................................. 348/143; 348/156
(58) Field of Search ...................................... 348/143, 152, 348/153, 154, 155, 159, 428, 512, 845.2, 845.1; 345/23, 178; H04N 7/18

(56) References Cited

U.S. PATENT DOCUMENTS

| 4,706,075 | * | 11/1987 | Hattori et al. | 345/23 |
| 4,922,339 | * | 5/1990 | Stout et al. | 348/143 |
| 4,929,935 | * | 5/1990 | Rysavy et al. | 345/178 |
| 5,396,284 | | 3/1995 | Freeman | 348/154 |
| 5,623,304 | * | 4/1997 | Ota et al. | 348/143 |
| 5,671,009 | * | 9/1997 | Chun | 348/153 |

FOREIGN PATENT DOCUMENTS

| 94-8813 | 9/1994 | (KR) . |
| 96-6637 | 2/1996 | (KR) . |
| 96-16569 | 5/1996 | (KR) . |

* cited by examiner

Primary Examiner—Howard Britton
Assistant Examiner—Nhon T Diep
(74) Attorney, Agent, or Firm—Greer, Burns & Crain, Ltd.

(57) ABSTRACT

There is provided an image change detecting machine and a method for easily monitoring the moving of subjects by using character generator.

The image change detecting machine comprises: a video camera for taking a photograph and outputting the video signal for it; a synchronous signal separating part for separating and outputting the video signal from the video camera into a vertical synchronous signal and a horizontal synchronous signal; a monitor for displaying the video signal from the video camera; a character generator for outputting letter signal the synchronousness of which matches with that of the video signal received from the video camera based on the synchronous signal applied from the synchronous signal separating part; an analog switches for overlapping the video signal from the video camera and the letter signal from the character generator and outputting it to the monitor, and detecting the change of the video signal at where the frequency of the video signal from the video camera and the frequency of the letter signal from the character generator match each other and outputting the detecting signal corresponding to this; a comparator for comparing the detecting signal from the analog switches with the standard signal and outputting the control signal corresponding to this; a main controlling part for determining the letter signal output from the character generator and controlling its location, and outputting the alarm signal in accordance with the control signal from the comparator; a buffer for stabilizing the control signal from the comparator and applying it to the main controlling part; and an alarm generating part for generating or cutting off alarm in accordance with the alarm signal from the main controlling part.

2 Claims, 3 Drawing Sheets

IMAGE CHANGE DETECTING MACHINE BY USING CHARACTER GENERATOR AND METHOD THEREOF

FIELD OF THE INVENTION

The present invention relates to a video signal and an image change detecting machine of a video displayer, and more particularly, an image change detecting machine for easily monitoring a moving subject via the image change by using character generator and a method thereby.

DESCRIPTION OF THE RELATED ART

Generally, television system has two kinds, that is, closed circuit system and open circuit system. CCTV is closed circuit system and sends visual information to specific viewers for a specific purpose. Normally, it is used in the finance-related security system such as bank, subway system, traffic condition monitoring system, etc. The conventional CCTV comprises video camera 1, signal transferring part 2, monitor 3, storing part 4, and main controlling part 5, as shown in FIG. 1.

The video camera 1 takes a photograph at a specific area for monitoring and outputs the taken video signals to the signal transferring part 2. The signal transferring part 2 transfers the video signal received from the video camera 1 to the signal capable of being output to the monitor 3, and outputs the signals to the monitor 3. The monitor 3 displays the video signal applied from the signal transferring part 2 for the supervisor who watches the specific area. The storing part 4 stores the taken photographs for later displaying. Because the camera 1 is always in taking a photograph or takes a photograph at a certain area for any time interval, the recording is long and it takes lots of tapes. The main controlling part 5 controls the whole operation of the CCTV system. When monitoring a specific area by using the CCTV system as described above, in other words, supervising a bank out of business hour, an alarm was equipped with the CCTV system such that the supervisor doesn't have to keep watching the monitor 3. Synchronous signal was separated from the video signal of the video camera. Then, it was transferred to PWM (Pulse Width Modulation). The image change in the specific area was detected by using the transferred signal, which is analog method. Or, by digital method, the video signal from the video camera 1 is transferred to A/D (Analog/Digital) for the detection of the image change for the determined area.

As described above, in the analog method, the image change detecting machine of the conventional CCTV needs a separate system structure because of signal treatment by the variation of the vertical and the horizontal synchronous signal pulse, and as a result, the control and the installation are complicated. Further, the portion indicating the monitored area is not uniform at moving because of the vertical and the horizontal frequency properties. In addition, malfunctioning sometimes occurs with respect to the level characteristics of video output of the video camera. On the contrary, the digital method makes up for the disadvantages of the analog method but the construction of the circuits is very complicated and requires a separate ASIC (Application Specific Integrated Circuit) so that high expenses for development and prices for the system are increased.

THE SUMMARY OF THE INVENTION

The present invention is directed to provide an image change detecting machine and a method by using a character generator, which substantially obviates one or more of the problems due to the limitation and the disadvantages of the related art.

One object of the present invention is to provide an image change detecting machine and a method for detecting the image change for a specific area, providing easy-controlling for the monitoring system with minimum hardware configuration, and taking photographs in case of the image change for the monitored area when VCR recording so that long time recording is possible and the reliability for the supervising is improved.

To achieve these and other objects and in accordance with the purpose of the present invention, as embodied and broadly described, the image change detecting machine comprises: a video camera for taking a photograph and outputting the video signal for it; a synchronous signal separating part for separating and outputting the video signal from the video camera into a vertical synchronous signal and a horizontal synchronous signal; a monitor for displaying the video signal from the video camera; a character generator for outputting letter signal the synchronousness of which matches with that of the video signal received from the video camera based on the synchronous signal applied from the synchronous signal separating part; an analog switches for overlapping the video signal from the video camera and the letter signal from the character generator and outputting it to the monitor, and detecting the change of the video signal at where the frequency of the video signal from the video camera and the frequency of the letter signal from the character generator match each other and outputting the detecting signal corresponding to this; a comparator for comparing the detecting signal from the analog switches with the standard signal and outputting the control signal corresponding to this; a main controlling part for determining the letter signal output from the character generator and controlling its location, and outputting the alarm signal in accordance with the control signal from the comparator; a buffer for stabilizing the control signal from the comparator and applying it to the main controlling part; and an alarm generating part for generating or cutting off alarm in accordance with the alarm signal from the main controlling part.

A method of detecting image change by using character generator comprises the steps of: a) determining the initial image from the picture applied from a video camera and displaying it on the monitor; b) determining the area to be supervised for the image change on the initial picture displayed on the monitor after the a) step; c) storing the initial character generator data corresponding to the determined supervised area after the b) step; d) inputting the picture from the video camera and displaying it on the monitor after the c) step; e) comparing the video data corresponding to the detected area on the video data being input at present after the d) step, and the initial character generator data corresponding to the detected area stored on the c) step; f) comparing if there is any image change on the determined detected area after the e) step, and going back to the step S4 if any image change is not detected; and g) generating alarm if image change is detected in the f) step, and completing the operation.

It is to be understood that both the foregoing general description and the following detailed description are exemplary and explanatory and are intended to provide further explanation of the invention as claimed.

THE BRIEF DESCRIPTION OF THE DRAWINGS

DETAILED DESCRIPTION OF THE PREFERRED EMBODIMENTS

Reference will now be made in detail to the preferred embodiments of the present invention, examples of which are illustrated in the accompanying drawings.

Figure 1:
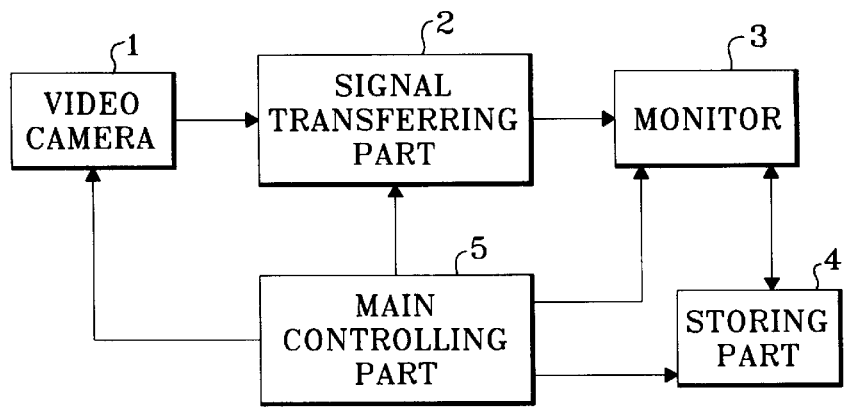
FIG. 1 is a block diagram showing the conventional CCTV monitoring system.
Figure 2:
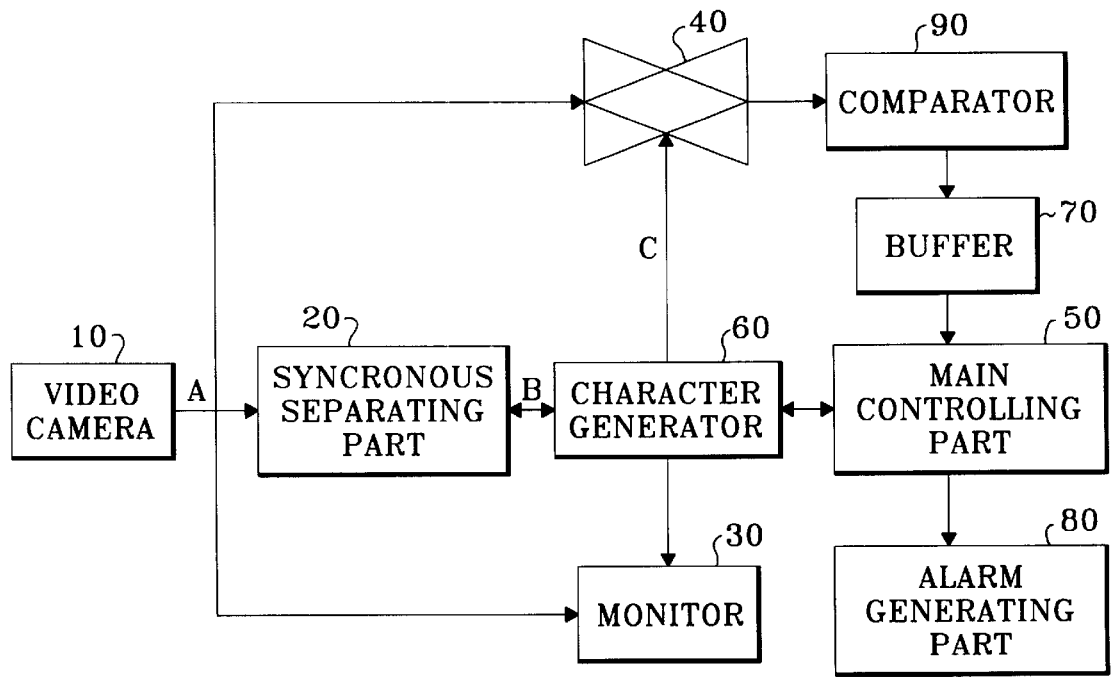
FIG. 2 is a block diagram showing an image change detecting machine by using a character generator according to the present invention.

The image change detecting machine by using a character generator according to the present invention as shown in FIG. 2, the machine comprises a video camera 10, a synchronous signal separating part 20, a monitor 30, an analog switches 40, a main controlling part 50, a character generator 60, a buffer 70, an alarm generating part 80, and a comparator 90.

The video camera 10 takes a picture of a specific area and outputs the visual signal thereof to the synchronous signal separating part 20 and the analog switches 40. The synchronous signal separating part 20 separates the visual signal applied from the video camera 10 into a vertical synchronous signal and a horizontal synchronous signal and outputs them to the character generator 60. The monitor 30 displays the visual signal applied from the video camera 10. The analog switches 40 outputs the visual signal where the scanning time frequency of the visual signal applied from the video camera 10 and the letter signal applied from the character generator 60 to the comparator 90, and the comparator 90 detects the level variation of the luminance level of the visual image applied from the analog switches 40 and outputs the control signal corresponding to this to the main controlling part 50 through the buffer 70. From the character generator 60, the main controlling part 50 controls the number of the letter and the marks in the monitored area like moving of the subject and determines and controls the signal of the output letters and then, outputs the alarming signal to the alarm generating part 80 in accordance with the control signal from the buffer 70. The character generator 60 makes the visual signal from the video camera 10 and the letter signal determined by the main controlling part 50 be synchronous in accordance with the synchronous signal applied from the synchronous signal separating part 20, and outputs the letter signal its synchronous signal being matched with the visual signal to the analog switches 40. The buffer 70 stabilizes the detect signal applied from the comparator 90 and outputs it to the main controlling part 50, and the alarm generating part 80 generates alarm or shut off it in accordance with the alarm signal from the main controlling part 50.

Figure 3:
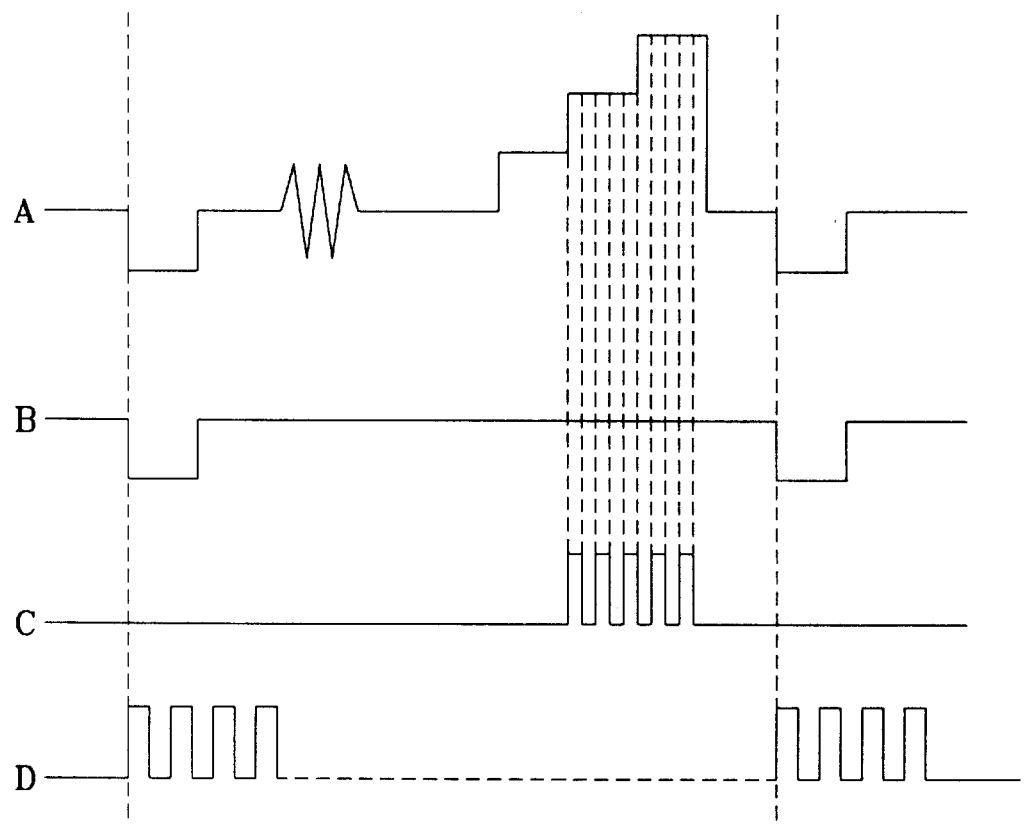
FIG. 3 shows wavelength of each module in the image change detecting machine by using a character generator according to the present invention.
Figure 4A:
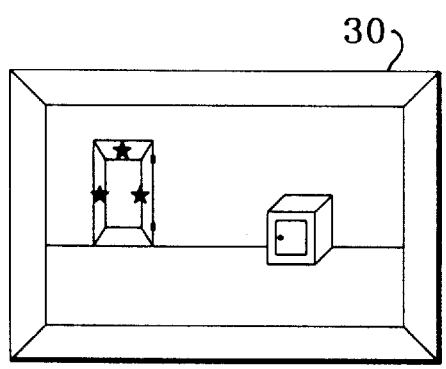
FIG. 4 is a representation of the operation of the image change detecting machine by using a character generator according to the present invention.

The picture taken by a video camera 10 is displayed via a monitor 30. The supervisor sets the picture displayed in the monitor 30 as an initial picture (step S1), and determines the area for monitoring the picture change in the set initial picture (step S2). For example, the accompanied FIG. 4a shows a specific room, its door being closed, and a safe. The supervisor marks a plurality of solid ★ on the handle of the closed door and the door in order to monitor the picture change around the door. The visual signal from the video camera 10 are divided into horizontal synchronous signal and vertical synchronous signal at the synchronous signal separating part 20 and are applied on the a character generator 60. The picture data applied from the video camera 10 is displayed via a monitor 30 and at the same time, the plurality of ★ marks are displayed overlapped around the door and the handle of the door. As shown in the FIG. 3, the character generator 60 get triggered at the increase or decrease of the horizontal synchronous signal (B) applied after being separated from the visual signal (A) at the synchronous signal separating part 20, and accordingly, the clock (D) starts to generate.

The cycle of the clock (D) becomes the standard of location of the horizontal and the vertical direction and size of the letters displayed on the monitor 30, and they are controlled by the main controlling part 50. Therefore, the character generator 60 generates a letter signal (C) matching with the synchronous signal of the visual signal (A). The ★ are overlapped and displayed on the monitor 30, and the analog switches 40 outputs a certain visual signal level on where the letter signal (C) is placed so that the picture change of the monitor area is detected. Then, the main controlling part 50 stores data of the character generator of the monitor area designated with the plurality of ★s (step S3), and again receives the picture from the video camera 10 and displays it on the monitor 30 (step S4). Then, the analog switches detects the visual signal from where the picture data corresponding to the monitoring area among the now-input picture data and the scanning time frequency of the character generator corresponding to the monitoring area stored on the step S3 are matched (step S5). It is detected if there is any picture change in the set monitoring area (step S6), and therefore, if the picture change is detected, alarm letter is displayed on the monitor by the main controlling part 50. The analog switch 40 detects the visual signal (A) applied from the video camera 10, the letter signal applied from the character generator 60, and luminance level of the scanning time frequency of the ★ marks and then, applies the detected signal to the comparator 90. When the luminance level is constant, the comparator 90 always maintains a low level, and if the distortion level changes, the comparator 90 is changed into a high level so as to output the detected signal to the main controlling part 50 through a buffer 70. That is, if there is no change in the picture of the location of the ★ marks, at the time when the letter signal (C) for the letter ★ is output, the picture signal (A) matches with the data frequency of character generator stored in the step S3 and the distortion level of the picture signal (A), which means there is no moving subject, and the comparator 90 always maintains a low level.

Figure 4B:
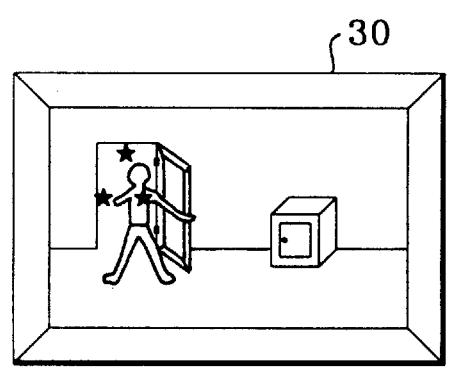
Figure 5:
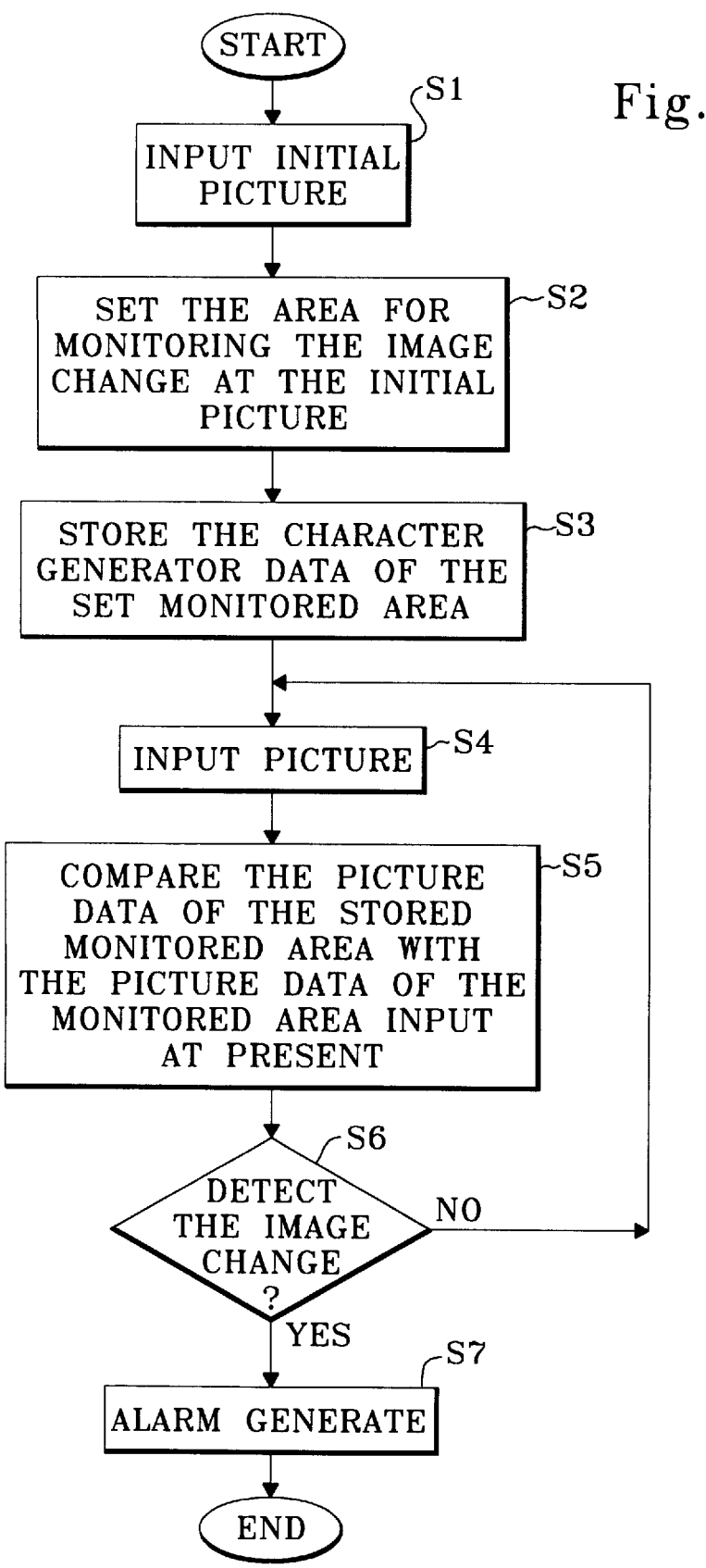
FIG. 5 illustrates an operational sequence of the method of detecting the image change by using a character generator according to the present invention.

Meanwhile, as shown in FIG. 4b, if human comes in opening the door, in the step S6, the analog switch 40 applies the distortion level of the ★ marks to the comparator 90 by the picture signal (A) applied from the video camera 10 and the letter signal (C) applied from the character generator 60, and the comparator 90 outputs the control signal corresponding to this to the main controlling part 50. Since the distortion level of the ★ mark location is changed, the comparator 90 is changed into a high level so as to output the detecting signal to the main controlling part 50 via the buffer 70, which means that a moving subject occurs. As a result, the main controlling part 50 displays the alarm letter onto the monitor 30 and generates alarming signal so as to apply it to the alarm generator 80. Corresponding to this, the alarm generator 80 turns on the alarm lamp or operates the alarm device (step S7). The supervisor recognizes an intruder.

Meanwhile, if the picture change is detected in the step S6, the picture of the monitoring area is taken from the time and therefore, picture taking is possible longer than always-picture taking along with the tape saving. Also, when watching the taken-picture, the detecting effect can be optimized for short time. The present invention can be applied on the video phone or other picture displaying device besides the CCTV so as to easily detect the picture change without spending much expenses for the expensive supplementary apparatus in order to detect the picture change.

Therefore, according to the present invention, by detecting the picture change of a specific area of the visual signal by using a character generator, it can be efficiently applied on a video, and a monitoring machine for moving subject of visual signal, and especially, in the CCTV monitoring system or home TV, and displaying system for car, it provides the improvement in the reliability of the monitoring motion on a specific area with minimum hardware configuration at the moment of detecting the picture change.

Still further, while the present invention has been described in detail, it should be understood that various changes, substitutions and alterations can be made hereto without departing from the spirit and scope of the invention as defined by the appended claims.

What is claimed is:

1. An image change detecting machine comprising:

a video camera for taking a photograph and outputting the video signal for it;

a synchronous signal separating part for separating and outputting the video signal from the video camera into a vertical synchronous signal and a horizontal synchronous signal;

a monitor for displaying the video signal from the video camera;

a character generator for outputting letter signal the synchronousness of which matches with that of the video signal received from the video camera based on the synchronous signal applied from the synchronous signal separating part;

an analog switches for overlapping the video signal from the video camera and the letter signal from the character generator and outputting it to the monitor, and detecting the change of the video signal at where the frequency of the video signal from the video camera and the frequency of the letter signal from the character generator match each other and outputting the detecting signal corresponding to this;

a comparator for comparing the detecting signal from the analog switches with the standard signal and outputting the control signal corresponding to this;

a main controlling part for determining the letter signal output from the character generator and controlling its location, and outputting the alarm signal in accordance with the control signal from the comparator;

a buffer for stabilizing the control signal from the comparator and applying it to the main controlling part; and an alarm generating part for generating or cutting off alarm in accordance with the alarm signal from the main controlling part.

2. A method of detecting image change by using character generator comprising the steps of:

a) determining the initial image from the picture applied from a video camera and displaying it on the monitor;

b) determining the area to be supervised for the image change on the initial picture displayed on the monitor after the a) step;

c) storing the initial character generator data corresponding to the determined supervised area after the b) step;

d) inputting the picture from the video camera and displaying it on the monitor after the c) step;

e) comparing the video data corresponding to the detected area on the video data being input at present after the d) step, and the initial character generator data corresponding to the detected area stored on the c) step;

f) comparing if there is any image change on the determined detected area after the e) step, and going back to the step S4 if any image change is not detected; and g) generating alarm if image change is detected in the f) step, and completing the operation.

* * * * *